United States Patent [19]
Srivastava et al.

[11] 3,967,070
[45] June 29, 1976

[54] MEMORY OPERATION FOR 3-WAY COMMUNICATIONS

[75] Inventors: Dinesh K. Srivastava, Westmont; David Q. Lee, Chicago, both of Ill.

[73] Assignee: GTE Automatic Electric Laboratories Incorporated, Northlake, Ill.

[22] Filed: Aug. 21, 1975

[21] Appl. No.: 606,698

[52] U.S. Cl. ............................ 179/15 AT; 179/15 AQ
[51] Int. Cl.² ........................................... H04J 3/00
[58] Field of Search ........ 179/15 AT, 15 AQ, 15 A, 179/15 BW, 15 ES; 340/172.5

[56] References Cited
UNITED STATES PATENTS

| | | |
|---|---|---|
| 3,046,348 | 7/1962 | Osborn ........................ 179/15 AT |
| 3,632,883 | 1/1972 | Aagaard ....................... 179/15 AQ |
| 3,740,482 | 6/1973 | Plank et al. .................. 179/15 BW |
| 3,832,492 | 8/1974 | Charransol et al. .......... 179/15 AT |
| 3,927,267 | 12/1975 | Voyer et al. .................. 179/15 AQ |

*Primary Examiner*—Thomas A. Robinson
*Attorney, Agent, or Firm*—Robert J. Black

[57] ABSTRACT

A regimented memory arrangement in which "Read" and "Write" operations take place simultaneously. Three-way communications are facilitated by the technique disclosed.

6 Claims, 1 Drawing Figure

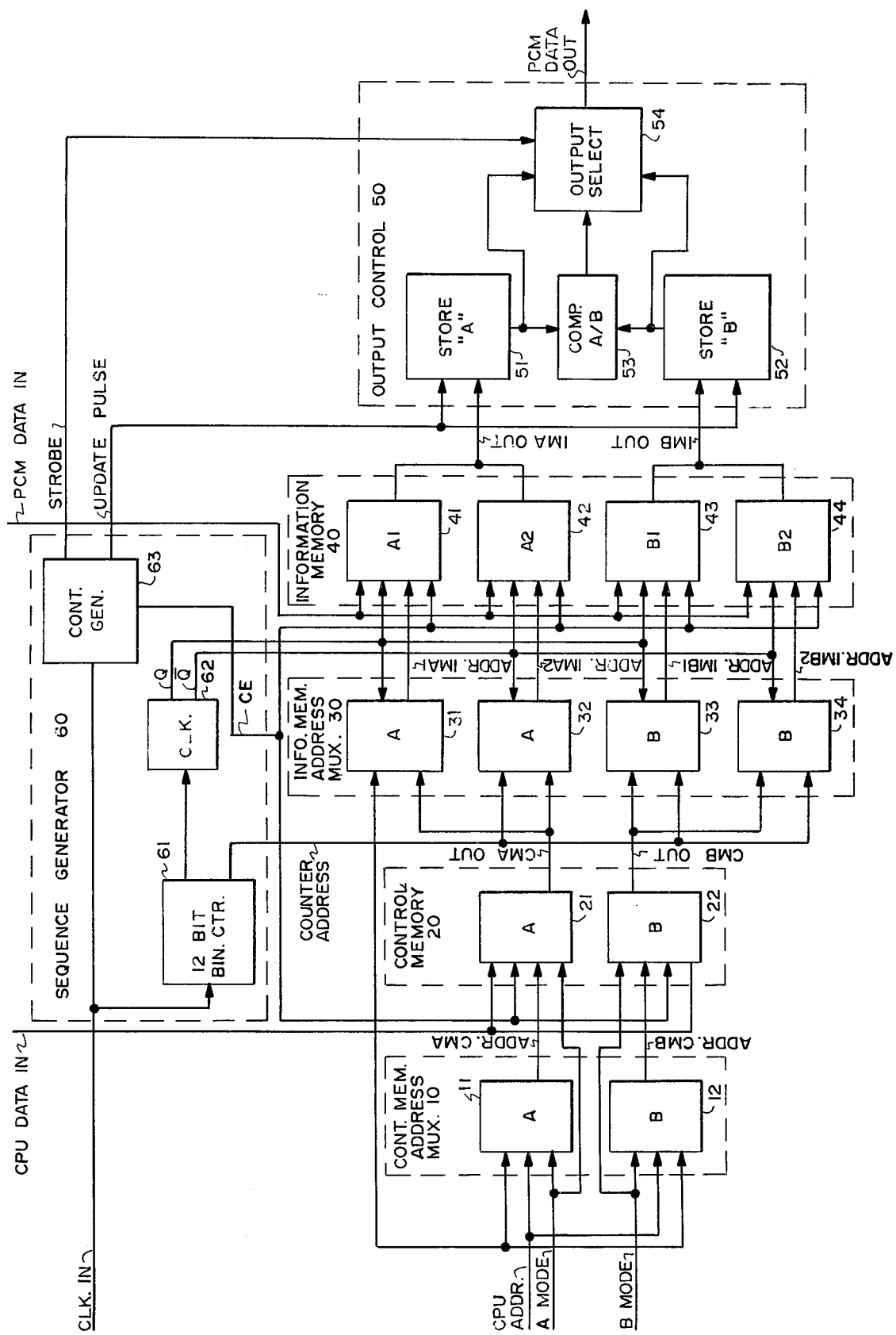

MEMORY OPERATION FOR 3-WAY COMMUNICATIONS

BACKGROUND OF THE INVENTION

1. Field of the Invention

This invention relates in general to telecommunication systems of the type employing pulse code modulation and wherein switching is accomplished on a time division multiplex basis. More particularly the present invention is drawn to a technique wherein 3-way communications are accomplished by means of a single cycle of memory access wherein all operations are performed in parallel simultaneously in time thus substantially increasing time switch capacity.

2. Description of the Prior Art

In telecommunication systems wherein switching is accomplished on a time division multiplex basis, the information memory is normally scanned at an 8 Khz rate (this being the same sampling as the voice sampling rate) and for each port having access thereto the included random access memories are accessed three times. Thus, as the number of parts is increased, the cycle times for random access memory access becomes smaller, limiting the ultimate capacity of such time switches.

In a conventional approach for an all time non-blocking time switch, wherein the dwell time per port and the number of access per port is fixed, memory access time specified determines the maximum number of ports. Thus when a large number of ports is to be accommodated faster memories are required and faster associated peripheral circuitry. With a given memory specification, more ports than the ultimate capacity may be accommodated by duplicating the network in blocks of the ultimate size. Since each block operates independently in parallel the amount of memory required increases approximately as the square of the number of blocks operating in parallel. If the three cycles of operation could be combined into one using additional information memory only, then the time switch capacity could be increased threefold using the same memories and the same dwell time per port. In this particular approach the amount of hardware is almost linear as opposed to almost square growth with the previously outlined approach.

In the past various systems have been developed with the purpose of combining several cycles of operation into one for the purposes outlined above. U.S. Pat. No. 3,046,348 to Osborn discloses a memory system utilized in a telephone system wherein read and write operations are both carried out within the same time period. In the arrangement disclosed a time slot is divided into two portions. The first portion is used to readout the memory while the second portion is used to write in the memory. While read and write occur within the same period, they do not occur simultaneously, neither does the disclosed arrangement provide for conferencing.

In U.S. Pat. No. 3,740,482 to Plank et al., a time division telephone system is disclosed which sequentially samples messages transmitted between two central offices. In the arrangement taught, transmission of messages is parallel because messages are sampled along a plurality of buses and a plurality of switching devices are each operatively related to a separate sample storage means in the transmitting station into one of the buses. Again simultaneous read and write with its attendant advantages is not disclosed.

U.S. Pat. No. 3,632,883 to Aagaard discloses a time division multiplex telecommunication exchange wherein information from all the channels is sequentially stored in a memory along with the code numbers. At a time determined by the address and output channel, the address and input channel is introduced into a second register. The output of the second register is decoded and used to switch the output of the first register so as to read the contents of the first register. However, the entering of the information into the register and the switching of the output of the register do not occur simultaneously. Aagaard also does not provide any provision for three way conferencing.

Accordingly it is the purpose of the present invention to describe a technique for use in time division multiplex switching systems whereby three consecutive cycles of memory access per port are reduced to a single cycle by performing all operations simultaneously so that the switch time capacity in a pulse code modulated time switch can be increased.

SUMMARY OF THE INVENTION

In a switching system according to the present invention, memory is provided which is divided into four identical blocks or portions. The write operation is performed on a pair of memory blocks in parallel, addressed sequentially by a binary counter. The read operation is performed on the other pair of memory boxes, addressed at random by their respective control memories. The operations are then reversed in subsequent frames causing a fixed one frame delay for all ports between write and read. In the technique shown lower speed memories may be employed for a fixed number of ports, since the three cycles of operation are reduced to a single cycle per port; conversely given a particular memory device the port capacity of the time switch can be increased three times.

After the ultimate size is achieved additional hardware will be required on a squarely increasing amount but it will be obvious from the foregoing that this arrangement has three times larger ultimate size and hence the initial hardware ratio advantage is retained for any size.

Other advantages of the proposed technique include a network capacity considerably reduced with attendant lower power and space requirements. The suggested technique also provides simplified and reduced control of the time switch, fewer peripheral circuits and less wiring between hardware components. Simultaneous input and output of pulse code modulated data reduces storage requirements, gating requirements and timing requirements.

As noted above two possible approaches are suggested with the input being written in sequentially for each port in either approach however the output to individual ports could be from the current frame or the past frame in a conventional approach while in the disclosed approach all ports receive previous frame data, thus the output does not have to be stored and sorted out in those applications where all data must be from the same frame.

DESCRIPTION OF THE DRAWING

The single sheet of drawings appended hereto consists of a block diagram of the memory portions of a time division multiplex telecommunication switch arranged in accordance with the present invention.

DESCRIPTION OF THE PREFERRED EMBODIMENT

Referring now to the single sheet of drawings the memory circuitry disclosed herein consisting of control memory 20 and information memory 40 are all random accessed memories. Control memory 20 consists of A portion 21 and B portion 22 while information memory 40 consists of A1 portion 41 and A2 portion 42, B1 portion 43 and B2 portion 44. Both A and B portions of the control memory 20 are identical and each of the information memory portions 41, 42, 43 and 44 are identical. The A control memory portion 21 and the B control memory portion 22 contain the two possible addresses in a specific word location indicating interconnection between three ports.

The addresses within control memory portion A and control memory portion B are written in by an associated central processor unit. The A1 information memory portion 41 and the B1 information memory portion 43 are grouped as a first pair and the A2 information memory portion and the B2 information memory portion are grouped as a second pair. These four memory portions are used for pulse code modulated data manipulation for time switching. The information memory address multiplexer portions 31, 32, 33 and 34 that form a portion of information address multiplexer 30 provide the counter address to that pair of information memory portions in the write mode and individual addresses to that pair of information memory portion in the random read mode. The control memory address multiplexer 10 consisting of A portion 11 and B portion 12 normally puts the control memory portions 21 and 22 in the read mode and provides the counter address sequentially, except when the central processor unit selects the control memory A (CMA) mode or control memory B (CMB) mode causing the central processor unit data to be written into the control memory selected, in an address location provided by the central processor unit.

The output control 50 provides storage for two sets of data readout, comparison of the information readout and output gating. Non-central process unit addresses, timing and control are provided by the sequence generator 60 which consists of a binary counter 61, a J-K flip-flop shown as clock 62 and phase-shift circuitry comprised of control generator 63.

The control generator for a simple stream of clock pulses generates all the timing pulses and the read, write and mode control signals for control memory A, control memory B, etc. The clock input pulses to the sequence generator 60 are at a rate of 24.704 MHz giving approximately 40 nanoseconds (ns) dwell time per port for 3,072 ports with a sync pulse of 16 inputs duration, i.e., 640 ns. This is a frame of 125 microseconds giving an 8 Khz frame scan rate. The sync pulse toggles the J-K clock flip-flop 62 which causes pair 1 (information memory portions 41 and 43) and pair 2 (information memory portions 42 and 44) of the information 40 to be in read or write modes in alternate frames.

The counter address consists of 12 bits of which the two higher order bits may be decoded in a 1 out of 3 basis to put only one-third of the memories in the active mode to facilitate data manipulation by the central processor unit when the memories are inactive, and also to provide for modular growth in groups of 1024 ports, and for changing the control circuitry to work with a single information memory block of 1024 × 8 when the number of ports is limited to 1024.

In a particular frame when Q = 1 the A1 portion of the information memory 41 and the B1 portion of the information memory 43 are in the read mode. The control memory address multiplexer 10 provides a counter address as ADDR CMA (address for control memory A) to address A1 information memory 41 to read its contents. Similarly CMB OUT is steered to B1 information memory 43. At the same time the counter address signal is steered through the information memory address multiplexer 30 portions 31 and 32 with CMA coming out as address IMA2 to form an address to A2 information memory 42 to write in the PCM data in that location. (The PCM data is an 8 bit binary word sample representing a voice sample coded in D2 format and is a non-linear compression with H = 255.) Similarly the counter address signal is also steered to write in the same PCM data in the same location in B2 information memory 44. Thus the pair in the write mode contains the same information each memory module per port location. In the next frame Q = 0 and $\overline{Q} \neq 1$ and pair 2 consisting of information memory portions 42 and 44 is put in the read mode, when for each port address IMA2 reads out of A2 information memory 42 and address IMB2 reads out of B2 information memory 44. Since the data is written into a pair first, and read out in the next frame, there is a fixed one frame delay for every port between write and read. Thus the CMA OUT signal will always address A1 information memory 41 or A2 information memory 42 only and CMB OUT will address B1 information memory 43 and B2 information memory 44 only. The following chart illustrates the mode of operation of the time switch:

| Q | CMA | CMB | IMA1 | IMB1 | IMA2 | IMB2 |
|---|---|---|---|---|---|---|
| 1 | READ | | READ CMA OUT | READ CMB OUT | WRITE CNTR ADDR | |
| 0 | CNTR ADDR (EXCEPT WHEN CPU ALTERS MODE) | | WRITE CNTR ADDR | | READ CMA OUT | READ CMB OUT |

The output control unit 50 causes the IMA OUT signal taken from A1 or A2 information memory portions 41 and 42 to be stored in store A, 51 and IMB OUT to be stored in store B, 52 under control of the update pulse from sequence generator 60. The stored contents are then compared in comparator A/B 53 and the larger of the two words, i.e., IMA DATA or IMB DATA is steered to the output under control of the STROBE signal also from the sequence state generator 60 as PCM DATA OUT.

For less than 1024 ports, A1 information memory 41 is retained and B1 information memory 43, A2 information memory 42 and B2 information memory 44 may be deleted by modification to the control circuitry. Three CLOCK IN pulses are then used per port to perform the three cycles of operation in a manner similar to that found in the conventional approach.

For a further understanding of the present invention, a description of establishment of a 3-way connection between three different stations designated for the present purpose as speakers A, B and C respectively will be described. Assume for purposes of the present description that speaker A is located on time slot X, speaker B on time slot Y and speaker C on time slot Z. For the three speakers to communicate the central processor unit will have entered into the control memory A portion 21, speaker B's address on time slot X, speaker C's address on time slot Y and speaker A's address on time slot Z; on control memory B portion 22, speaker C's address is written on time slot X, speaker A's address on time slot Y and speaker B's address on time slot Z.

With control memory 20 normally in the read mode (unless updating is required from the central processor unit) the input addresses are taken from the counter 61 and the stored memory addresses are read cyclically, i.e., the address at time slot X is outputted before the address at time slot Y and that of time slot Y before time slot Z. The addresses outputted from control memory 20 are steered by the information address multiplexer 30 to the information memory address input of information memory 40. If the last frame to receive the pulse code modulated samples is IMA2 and IMB2, it is placed in the read mode. IMA2 and IMB2 would then each output a PCM sample from the stored memory from the location dictated by the addresses CMA OUT and CMB OUT to the output control 50 through A store 51 and B store 52 for comparison in comparator 53. The largest pulse code modulated sample is then selected and under control of the comparator by output select circuit 54 and outputted through the PCM data output lead on that time slot.

In summary during time slot X speaker A will receive the last frame speaker, either B or C depending on the larger of the two pulse code modulated samples. At time slot Y speaker B will receive speaker A's or C's PCM sample, depending on which has the larger magnitude and at time slot Z speaker C will receive either speaker A's or B's PCM sample. At the same time IMA1 and IMB1 are placed in the write mode and the counter addresses will steer speaker A's PCM sample on to time slot X, speaker B's PCM sample on to time slot Y and speaker C's PCM sample on to time slot Z. In the succeeding frame IMA1 and IMB1 will be in their read mode outputting PCM samples to output control 50, and IMA2 and IMB2 will be set to receive incoming PCM samples.

While but a single embodiment of the present invention has been shown it will be obvious to those skilled in the art that numerous modifications may be made without departing from the spirit and scope of the present application which shall be limited only by the scope of the claims appended hereto.

What is claimed is:

1. Memory means for use in a time division multiplex telephone switching system employing pulse code modulation, wherein said switching system operates under control of a connected central processor unit which generates control signals in accordance with an internal program and external call requests from a plurality of subscribers, said memory means comprising: a sequence generator including an input circuit connection to said central processor unit and a plurality of output connections, operating in response to cyclically recurring signals received from said central processor unit to generate a plurality of control signals; a control memory comprising first and second memory portions, each including circuit connections to said central processor unit and to said sequence generator; control memory multiplex means including first and second portions connected between said central processor unit and said control memory and including circuit connections to said sequence generator, operated in response to control signals from said sequence generator to selectively couple address information from said central processor unit to one of said control memory portions for storage therein; an information memory comprising first and second pairs of memory portions and including circuit connections to said switching system and to said sequence generator; information memory multiplex means comprising first and second pairs of multiplex portions and including circuit connections to said sequence generator; said first pair of multiplex portions connected between said first control memory portion and said first pair of information memory portions and said second multiplex portion pair connected between said second control memory portion and said second pair of information memory portions; said information memory multiplex means operated in response to cyclic signals from said sequence generator to couple information stored in said control memory portions to said information memory portions; and output control means including an output connection to said telephone switching system and circuit connections to said sequence generator and said information memory; said information memory operated in response to control information from said control memory coupled through said information address multiplexer, to store pulse code modulated data from said switching system, and in response to said sequence generator signals couple said coded data to said output control means; said control means periodically operated in response to said sequence generator to couple said data from said output control means to said telephone switching system.

2. Memory means as claimed in claim 1 wherein said sequence generator includes: counting means including an input circuit connected to said central processor unit and output circuit connections to said control memory multiplex means and to said information memory multiplex means, operated in response to said cyclically recurring pulses to provide operating signals to both of said multiplex means.

3. Memory means as claimed in claim 2 wherein said sequence generator further includes: a flip-flop circuit including an input circuit connected to said counting means and a first output circuit connected to a first portion of each pair of information memory multiplex means portions and connected to a first portion of each pair of information memory means portions, and a second output circuit connected to a second portion of each pair of information memory multiplex means portions and connected to a second portion of each pair of information memory means portions, said flip-flop periodically operated to provide output signals alternately on said first and second output circuits for conduction to said connected information memory multiplex means and said connected information memory means.

4. Memory means as claimed in claim 2 wherein said sequence generator further includes: a control pulse generator including an input circuit connected to said central processor unit and a first output circuit connected to both of said multiplex means and second and third output circuits connected to said output control means.

5. Memory means as claimed in claim 1 wherein said output control means include: comparator means; first and second storage means, each connected to a different one of said information memory portion pairs and each connected to said comparator means, operated in response to periodic control pulses from said sequence generator to store pulse code modulated data from said connected information memory means.

6. Memory means as claimed in claim 5 wherein said output control means further include: output selection means connected to said first and second storage means and to said comparator means, and an output circuit connected to said switching system; said comparator means operated in response to the magnitude of the data stored in one of said storage means being higher than that stored in the other said storage means, to generate a control signal to said output selection means, said output selection means operated in response to said control signal from said comparator means and a control signal from said sequence generator, to couple said higher magnitude pulse code modulated data to said switching system.

* * * * *

UNITED STATES PATENT AND TRADEMARK OFFICE
CERTIFICATE OF CORRECTION

PATENT NO. : 3,967,070
DATED : June 29, 1976
INVENTOR(S) : DINESH K. SRIVASTAVA and DAVID Q. LEE It is certified that error appears in the above-identified patent and that said Letters Patent are hereby corrected as shown below:

```
Column 1, line 21, delete "sampling";
         line 24, delete "parts" insert -- ports --;
         line 25, delete "becomes" insert -- become --; and
         line 30, delete "access" 1st occ. insert -- accesses --
Column 2, line 32, delete "boxes" insert -- blocks --;
         line 58, delete "in" insert -- . In --;
         line 58, after "approach" insert -- , --;
         line 58, after "however" insert -- , --; and
         line 64, after "same" insert -- time --.
Column 3, line 24, after "portion" insert -- 42 --;
         line 25, after "portion" insert -- 44 --.
Column 4, line 19, delete "H" insert -- h --.
```

Signed and Sealed this

Twelfth Day of October 1976

[SEAL]

Attest:

RUTH C. MASON
*Attesting Officer*

C. MARSHALL DANN
*Commissioner of Patents and Trademarks*